US010901165B2

(12) United States Patent
Benjamin et al.

(10) Patent No.: US 10,901,165 B2
(45) Date of Patent: Jan. 26, 2021

(54) DRY PADDED OPTIC FIBER RIBBONS FOR DRY OPTIC FIBER CABLE (71) Applicant: Sterlite Technologies Limited, Aurangabad (IN)

(72) Inventors: Seldon Benjamin, Spring, TX (US); Sravan Kumar, Aurangabad (IN); Kishore Sahoo, Aurangabad (IN)

(73) Assignee: STERLiTE TECHNOLOGiES LiMiTED, Aurangabad (IN)

( * ) Notice: Subject to any disclaimer, the term of this patent is extended or adjusted under 35 U.S.C. 154(b) by 0 days.

(21) Appl. No.: 16/176,342

(22) Filed: Oct. 31, 2018

(65) Prior Publication Data

US 2019/0369351 A1 Dec. 5, 2019

(30) Foreign Application Priority Data

Jun. 1, 2018 (IN) .............................. 201811020572

(51) Int. Cl.
*G02B 6/44* (2006.01)
*G02B 6/38* (2006.01)

(52) U.S. Cl.
CPC ......... *G02B 6/4494* (2013.01); *G02B 6/4403* (2013.01); *G02B 6/3885* (2013.01); *G02B 6/4411* (2013.01)

(58) Field of Classification Search
CPC ... G02B 6/3885; G02B 6/4403; G02B 6/4494
See application file for complete search history.

(56) References Cited

U.S. PATENT DOCUMENTS

| 5,621,842 | A  * | 4/1997 | Keller ................. | G02B 6/4403 385/109 |
| 6,295,401 | B1 * | 9/2001 | Rutterman ........... | G02B 6/4495 385/109 |
| 6,449,412 | B1 * | 9/2002 | Rutterman ........... | G02B 6/4404 385/100 |
| 6,749,446 | B2 * | 6/2004 | Nechitailo ........... | G02B 6/4429 385/102 |
| 7,254,303 | B2 * | 8/2007 | Parsons ................ | G02B 6/4494 385/100 |
| 7,349,607 | B2 * | 3/2008 | Schneider ............ | G02B 6/4405 100/109 |
| 7,646,952 | B2 * | 1/2010 | Parris .................. | G02B 6/4403 385/102 |
| 8,229,263 | B2 * | 7/2012 | Parris .................. | G02B 6/4429 385/109 |
| 8,369,668 | B1 * | 2/2013 | McNutt ................ | G02B 6/4494 385/109 |
| 9,594,224 | B2 * | 3/2017 | Baucom ................ | G02B 6/44 |
| 10,018,796 | B1 * | 7/2018 | Cook .................... | G02B 6/443 |
| 2004/0047573 | A1 * | 3/2004 | Lail ...................... | G02B 6/4405 385/111 |

(Continued)

*Primary Examiner* — Daniel Petkovsek (57) ABSTRACT

The present invention relates to padded optic fiber ribbons for dry optic fiber cables. The dry padded optic fiber ribbons include a plurality of optic fiber ribbons stacked on top of each other having a cross-sectionally rectangular shape. In addition, the dry padded optic fiber ribbons include a plurality of dry paddings. Each dry padding of the plurality of dry paddings has an inner side and an outer side. Further, the dry padded optic fiber ribbons include at least one tape wrapping around the plurality of dry paddings.

17 Claims, 8 Drawing Sheets

(56) References Cited

U.S. PATENT DOCUMENTS

| | | | |
|---|---|---|---|
| 2004/0091221 A1* | 5/2004 | Debban, Jr. | G02B 6/4411 385/114 |
| 2012/0014652 A1* | 1/2012 | Parris | G02B 6/4411 385/111 |
| 2015/0309274 A1* | 10/2015 | Hurley | G02B 6/4404 385/114 |

* cited by examiner

DRY PADDED OPTIC FIBER RIBBONS FOR DRY OPTIC FIBER CABLE

CROSS REFERENCE TO RELATED APPLICATIONS

The present invention claims the benefit of Indian Patent Application No. 201811020572 entitled the same filed on Jun. 1, 2018, the entire contents of which are incorporated herein by reference.

TECHNICAL FIELD

This invention relates to optic fiber cables. More specifically, this invention relates to dry padded optic fiber ribbons for dry optic fiber cable.

BACKGROUND

In optical telecommunication applications using optic fibers, water ingress, i.e., the entrance and migration of water inside of the optic fiber cable, is a major problem. Water ingress occurs when water enters the optic fiber cable through cuts, holes or other openings brought by installation, environmental and/or human activities, animals, and various other factors encountered especially in outdoor applications. The water that enters inside of the cable may also migrate through the free spaces thereof, i.e. the empty spaces inside of the various housings of the cable that are not fully occupied by the various cable components. Water ingress negatively impacts the performance of optic fiber cables, causing serious problems such as Polarization Mode Dispersion ("PMD") that interrupt the normal operation of the cable and require complicated and expensive methods to resolve.

Depending on the different methods for preventing and mitigating the water ingress problem, fiber optic cables are generally categorized into two types, namely gel-filled cables and dry cables. Gel-filled cables tackle the water ingress problem by filling up the free spaces inside of the various housings of the cable with gel-form compounds which substantially eliminate the free spaces inside of the housings of the cable. Dry cables on the other hand solve the water ingress problem by placing dry absorbent materials inside of the cable that absorbs the water in the free spaces. In addition, the absorbent material in the dry cable may also be able to transform into gel-like physical states after encountering water, thus filling up the free spaces and stopping more water from entering and/or migrating in the cables.

Despite the effectiveness of the gel-filled cables in solving the water ingress problem, there are disadvantages of the gel-filled cables. For instance, gel contained in the gel-filled cables is very messy to handle and requires substantial cleaning time, making it an inconvenience for the technicians and increasing the cost of the project. Dry cables, however, require significant less preparation and clean-up time. After balancing the various pros and cons between the two types of the cables, dry cables are preferred in many applications.

Optic fibers are waveguides within which the optical information is communicated. It is a critical component of the optic fiber cable. The optic fibers are very delicate and protected in multiple ways with overlapping safeguards to ensure the performance of the optic fibers under various conditions. For dry cables, one layer of the protection is to package or shield the optic fibers in water absorbent materials. Optic fibers come in different shapes. Among the various optic fibers, optic fiber ribbons are a regular choice for optic fiber cables. The advantages of the optic fiber ribbon include high density of the fiber counts per unit space, good fiber organization and convenient optic fiber handling and management. When used in optic fiber cables, one of the common designs is to stack the ribbons on top of each other and put them in tubes, such as loose tube or central tubes.

In the conventional art, dry tapes, a water absorbent material, are applied on the outside of the stacked ribbons for water proofing/dry packaging. However, there are problems with the dry packaging of the stacked ribbons in the conventional art. For instance, in the conventional art, dry tapes are applied along the direction the ribbons extend between the access points. To cover the entire external side of the stacked ribbons, oftentimes two dry tapes are applied from opposite sides onto the stacked ribbons, each covering substantially half of the outside of the stacked ribbons. However, where the two tapes overlap, there will be a double folding area. The double folding area is prone to forming small gaps, leading up to water ingress. Further, the stacked ribbons are cross-sectionally rectangular. When the dry tapes are applied around the corners of two perpendicular sides, the tapes are more compact around the corner but gradually loosen up as it leaves the corner. This geometry mis-match also results in the uneven thickness of the tapes and uneven water blockage performance around the perimeter of the stacked ribbon, which negatively affects the performance of the dry cable.

Therefore, there is a need to provide dry padded optic fiber ribbons for dry optic fiber cable that address those problems.

OBJECT OF THE DISCLOSURE

A primary object of the present invention is to provide dry padded optic fiber ribbons that improve the symmetry of the packaged ribbons.

Another object of the present invention is to provide dry padded optic fiber ribbons that provide improved performance on water blockage.

Yet another object of the present invention is to provide dry padded optic fiber ribbons with improved optic performance that reduces the problem of Polarization Mode Dispersion ("PMD").

Yet another object of the present invention is to provide dry padded optic fiber ribbons that are convenient for handling.

Yet another object of the present invention is to provide dry padded optic fiber ribbons with manufacture advantages.

SUMMARY

In an aspect, the present disclosure relates to dry padded optic fiber ribbons for dry optic fiber cables. The dry padded optic fiber ribbons include a plurality of optic fiber ribbons stacked on top of each other having a cross-sectionally rectangular shape. In addition, the dry padded optic fiber ribbons include a plurality of dry paddings. Each dry padding of the plurality of dry paddings has an inner side and an outer side. Further, the dry padded optic fiber ribbons include at least one tape wrapping around the plurality of dry paddings. Each of the plurality of dry paddings is attached to one side of the rectangular shape of the stacked optic fiber ribbons. Each inner side of the plurality of dry paddings is in a flush contact with one side of the rectangular shape and the outer sides of the plurality of dry paddings form an elliptical shape.

In another aspect, the present disclosure relates to dry padded optic fiber ribbons for dry optic fiber cables. The dry padded optic fiber ribbons include a plurality of optic fiber ribbons stacked on top of each other having a cross-sectionally rectangular shape. In addition, the dry padded optic fiber ribbons include a plurality of dry paddings. Each dry padding of the plurality of dry paddings has an inner side and an outer side. Further, the dry padded optic fiber ribbons include at least one tape wrapping around the plurality of dry paddings. Each of the plurality of dry paddings is attached to one side of the rectangular shape of the stacked optic fiber ribbons. Each inner side of the plurality of dry paddings is in a flush contact with one side of the rectangular shape and the outer sides of the plurality of dry paddings form an elliptical shape. Each of the plurality of dry paddings is made of a water absorbent material. In addition, each of the plurality of dry paddings has a thickness of about 0.6 millimeter. The dry padded optic fiber ribbons have a diameter of about 5.5-6.5 millimeters when there are 12 ribbons and each ribbon has 12 fibers.

STATEMENT OF THE DISCLOSURE

In an aspect, the present disclosure relates to dry padded optic fiber ribbons for dry optic fiber cables. The dry padded optic fiber ribbons include a plurality of optic fiber ribbons stacked on top of each other having a cross-sectionally rectangular shape. In addition, the dry padded optic fiber ribbons include a plurality of dry paddings. Each dry padding of the plurality of dry paddings has an inner side and an outer side. Further, the dry padded optic fiber ribbons include at least one tape wrapping around the plurality of dry paddings. Each of the plurality of dry paddings is attached to one side of the rectangular shape of the stacked optic fiber ribbons. Each inner side of the plurality of dry paddings is in a flush contact with one side of the rectangular shape and the outer sides of the plurality of dry paddings form an elliptical shape.

BRIEF DESCRIPTION OF FIGURES

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

One or more embodiments are illustrated by way of example, and not by limitation. In the figures of the accompanying drawings, elements having the same reference numeral designations represent like elements throughout. The drawings are not to scale, unless otherwise noted. It is to be understood that all terminologies and phraseology used herein are for the purpose of illustrating, and should not be understood as limiting. The phrases such as "including", "comprising", "having" and other variations thereof are meant to encompass the items as described, their equivalents without excluding any additional items thereof. The term "rectangle" and its derivative terms when used to refer to shapes also include the shape of square, as squares are a special form of rectangles with equal length sides. Similarly, the term "ellipse" and its derivative terms when used to refer to shapes also include the shape of circle, as circles are a special form of ellipses with equal length foci.

Figure 1:
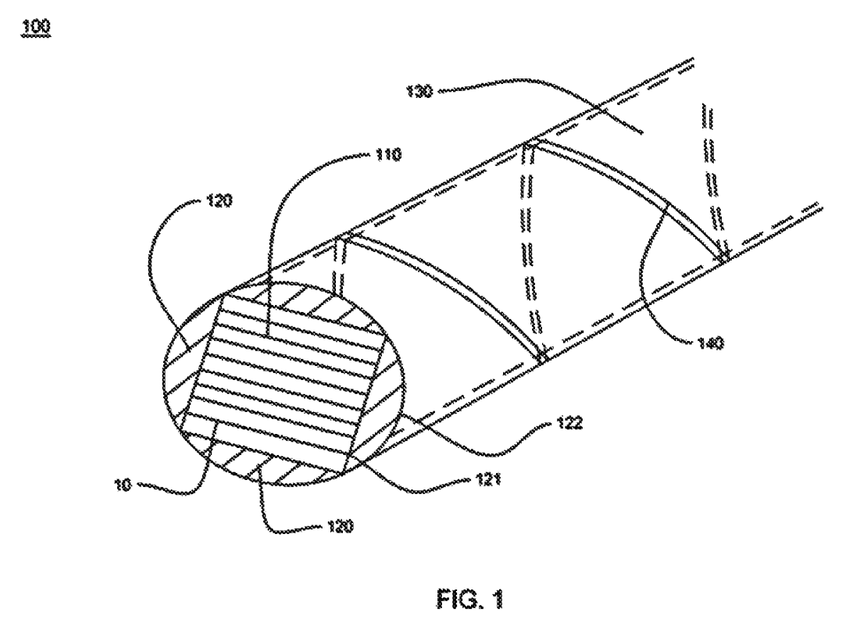
FIG. 1 is a perspective view of the dry padded optic fiber ribbons according to a preferred embodiment of the present invention.

FIG. 1 is a perspective view of the dry padded optic fiber ribbons according to a preferred embodiment of the present invention. Referring to FIG. 1, the dry padded optic fiber ribbons 100 comprise stacked optic fiber ribbons 110, a plurality of dry paddings 120 and at least one tape 130. Each of the plurality of dry paddings 120 is made of a super absorbent non-woven polymer. The stacked optic fiber ribbons 110 comprise a plurality of optic fiber ribbons 10 stacked on top of each other. The at least one tape 130 may be made of water absorbent dry tapes. Alternatively, the at least one tape 130 may be made of non-absorbent materials such as nylon. The dry padded optic fiber ribbons 100 may be installed inside of housings, such as loose tubes or central tubes, which may be further included in side of other housings of the dry optic fiber cables.

Figure 2:
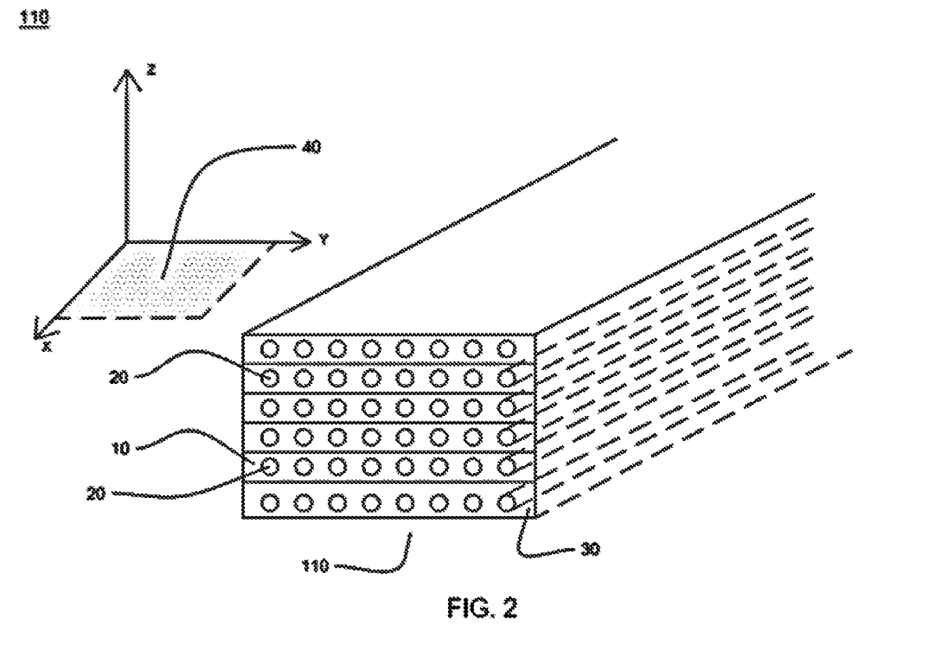
FIG. 2 is a perspective view of the stacked optic fiber ribbons 110.

FIG. 2 is a perspective view of the stacked optic fiber ribbons 110. Referring to FIG. 2, the stacked optic fiber ribbons 110 comprise the plurality of optic fiber ribbons 10 stacked on top of each other, aligned in such a way that cross-sectionally the stacked ribbons have a rectangular shape. Each of the plurality of optic fiber ribbons 10 in the stacked optic fiber ribbons 110 comprises a ribbon matrix 30 and a plurality of optic fibers 20 disposed in the ribbon matrix 30. The ribbon matrix 30 not only protects the plurality of optic fibers 20 disposed therein, but also provides a structural support for the optic fibers 20 to be closely and evenly spaced from each other in a precise way. The precisely disposed optic fibers 20 run in parallel on a common plane 40 along a length axis X of the plurality of optic fiber ribbon 10. The number of the optic fibers in the ribbon may vary, but is usually a number of power of 2, such as 4, 8 or more. Denoting the number of optic fibers in each of the ribbon with m, and the number of ribbons in the stack with n, there will be a total number of n times m optic fibers in the stacked optic fiber ribbons 110, forming a two-dimensional optic fiber array.

Referring back to FIG. 1, the plurality of dry paddings 120 are in contact to the external side of the stacked optic fiber ribbon 110 and cover all sides of the stacked optic fiber ribbon 110. Each of the plurality of the dry paddings 120 has an inner side 121 and an outer side 122. According to a preferred embodiment of the present invention, the inner side 121 is configured in such a way that it can be placed in a flush contact with one of the external sides of the cross-sectionally rectangular stacked optic fiber ribbon 110. Correspondingly, the outer side 122 is configured to curve in such a way that when each of the external side of the stacked optic fiber ribbons 110 has a dry padding 120 attached to it, the combined outside contour of the dry paddings 120 forms a substantially elliptical shape cross-sectionally. Each of the plurality of dry paddings 120 comprises polyester, polyacrylate and water swellable powder. In addition, each of the plurality of dry paddings 120 has a thickness of about 0.6 millimeter at the centre when there are 12 optic fiber ribbons and each ribbon encloses 12 optic fibers. In other words, the plurality of dry paddings 120 surrounds the 12 optic fiber ribbons and has a thickness of about 0.6 millimeter at the center of ellipse.

In an embodiment, the plurality of dry paddings 120 is used to improve the symmetry of the packaged ribbons. In addition, the plurality of dry paddings 120 improves performance on water blockage. Further, each of the plurality of dry paddings 120 improves optic performance that reduces the problem of Polarization Mode Dispersion ("PMD"). Generally, Polarization Mode Dispersion (PMD) is form of modal dispersion where two different polarizations of light in a waveguide, which normally travel at the same speed, travel at different speeds due to random imperfections and asymmetries, causing random spreading of optical pulses.

Figure 3A:
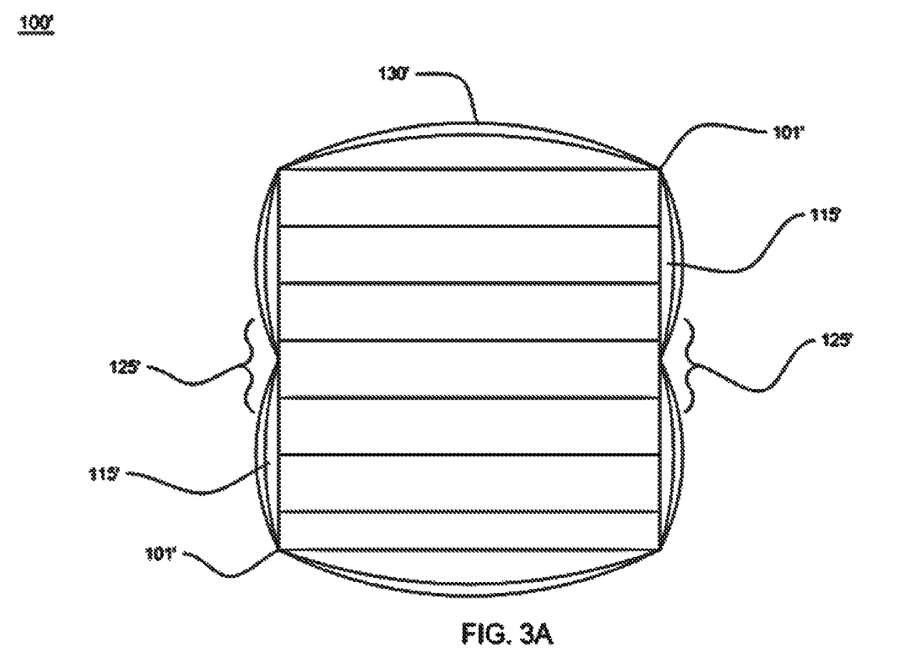
FIG. 3A (prior art) is a cross-sectional view of conventional dry padded fiber optic ribbons.

The advantages of the plurality of dry paddings 120 of the present invention are further explained in detail in connection with FIGS. 3A-3B. FIG. 3A (prior art) is a cross-sectional view of conventional dry padded fiber optic ribbons. Referring to FIG. 3A, the prior art dry packaged fiber optic ribbons 100' comprise the stacked optic fiber ribbons 110' and two dry tapes 130' applied from opposite sides of the stacked ribbon 110', each covering substantially half of the outside of the stacked ribbons 110'. As illustrated in FIG. 3A, the two dry tapes 130' overlap at a double folding area 125' on two opposite sides of the stacked ribbons 110'. The double folding areas 125' thus contain at least two layers of the dry tapes 130'. As such, the double folding areas 125' are thicker than the rest of the dry packaged ribbons 100' which negatively affect the form factor of the dry packaged ribbons 100'.

Further, because the stacked ribbons are cross-sectionally rectangular, the conventional dry packaging of the stacked fiber optic ribbons causes geometry mis-match between the dry package and the stacked ribbons. In the convention art, when the dry tapes 130' are applied around the corners 101' of two perpendicular sides of the stacked ribbons 110', the corners 101' will protrude out on the surface of the dry tapes 130', making the dry tapes 130' thinner around the corners 101' while gradually loosen up as the tapes leave the corners 101'. This unevenness of the dry tapes 130' around the perimeter of stacked ribbons 110' may induce gaps 115' to be formed starting from the midways between the corners 101'. Even when there are no gaps formed, the density of each of the two dry tapes 130' are higher at the corners 101' and lower at the mid-points between the corners. Those effects result in the uneven water blockage performance around the perimeter of the stacked ribbons.

Figure 3B:
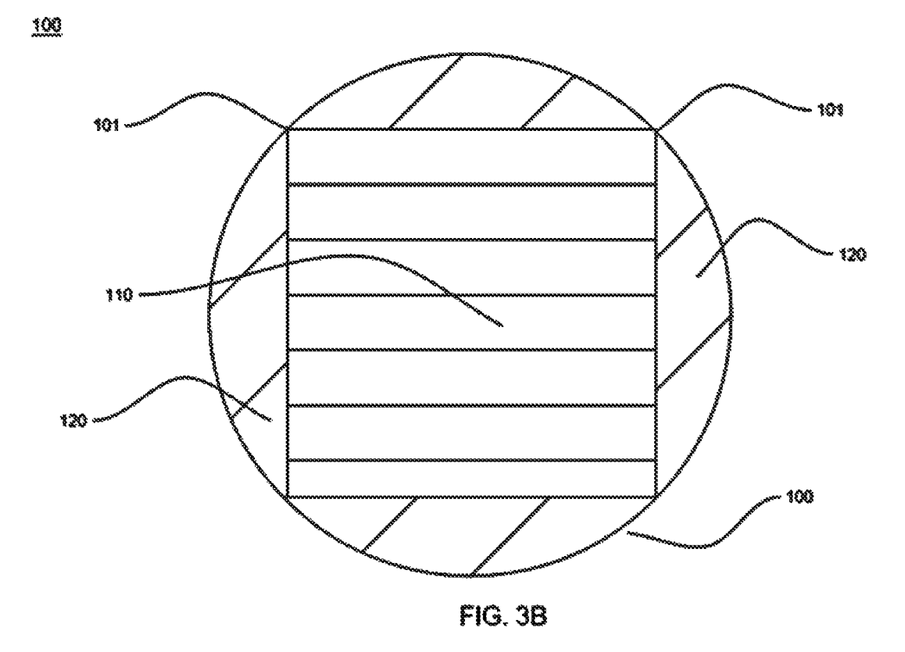
FIG. 3B is a cross-sectional view of dry padded optic fiber ribbons according to a preferred embodiment of the present invention.

FIG. 3B is a cross-sectional view of dry padded optic fiber ribbons according to a preferred embodiment of the present invention. Referring to FIG. 3B, four dry paddings 120 are applied on each side of stacked ribbons. As described above in connection with FIG. 1, the inner sides 121 are in flush contact with the external of the stacked optic fiber ribbon 110 and the outer sides 122 are configured to curve in such a way that when each of the external side of the stacked optic fiber ribbons 110 has a dry padding 120 attached to it, the combined outside contour of the dry paddings 120 form a substantially elliptical shape cross-sectionally. Comparing to the convention art illustrated in FIG. 3A, it can be appreciated by people of the ordinary skill of the art, that the addition of the dry paddings 120 solve the aforementioned problems of the prior art. First, the double folding areas 125' are eliminated. The edges of dry paddings 120 can be cut in various ways that ensures seamless transitions between the dry paddings. Further, because the dry paddings 120 are no longer folded around the corners 101, tensions, if any, within the dry paddings 120 will be evenly distributed, eliminating the forming of gaps or uneven tension distribution throughout the dry tapes 130' caused by the dry tape 130''s cross-side application in the conventional art, eliminating the chance of gap-forming along the perimeter of the stacked optic fiber ribbons 110. As such, it can be appreciated by people of ordinary skill of the art that the dry padded fiber optic ribbons of the present invention improve the stacked optic fiber ribbons' performance on water ingress.

Figure 4A:
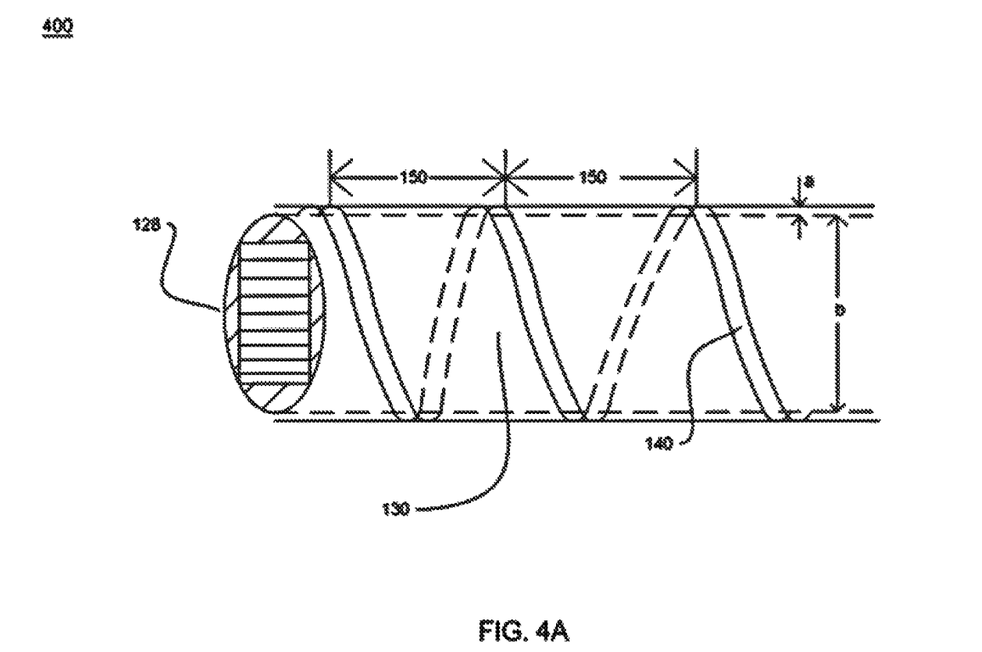
FIG. 4A is a side view of the dry padded fiber optic ribbons according to an embodiment of the present invention.

Referring back to FIG. 1, to help attach the dry paddings 120 around to the dry stacked optic fiber ribbons 110, the at least one tape 130 wraps around the stacked optic fiber ribbons 110 in a spiral manner along the direction the stacked optic fiber ribbons 110 extend between access points. The advantages of the spirally applied the at least one tape 130 are further explained in connection with FIG. 4.

FIG. 4A is a side view of the dry padded optic fiber ribbons 100 according to an embodiment of the present invention. Now referring to FIG. 4A, padded stacked ribbons 128, i.e. the stacked optic fiber ribbons 110 with a plurality of dry paddings 120 applied as illustrated in FIG. 1 and FIG. 3B, extends in the horizontal direction herein. The spirally applied the at least one tape 130 continuously wraps around the padded stacked ribbons 128 in repeated cable lays 150. Each cable lay 150 represent one spiral wrap of the tape 130 around the padded stacked ribbons 128. According to a preferred embodiment of the present invention, between the neighboring cable lays 150, there are air gaps 140 formed therein. In other words, the at least one tape 130 is applied with gaps between each repeated circle as it spirally rotates along the direction the padded stacked ribbons 128 extend. The width of the air gaps 140 between the cable lays 150 can be adjusted during the manufacturing process. The air gaps 140 with its tilted direction extending downward induce water on the outside of the padded stacked ribbons 128 to flow downward along it, dispelling water concentration that may be formed thereon. As illustrated in FIG. 4A, dry tape 130 has a thickness of 0.6 millimeter. In addition, the padded stacked ribbons 128 have diameter of around 5.5-6.5 millimeter when there are 12 ribbons and each ribbon include 12 optic fibers. As illustrated herein, the padded stacked ribbons 128 have a cross-sectionally ellipse shape. Therefore, depending on the orientation of the cable, the axial length b is in the range of the length of the minor axis and the major axis of the ellipse. As such, the height of the packaged ribbons is substantially b+2a, with the height of b at the air gaps 140. This design provides a compact and uniform cable height throughout the dry padded optic fiber ribbons 100.

Figure 4B:
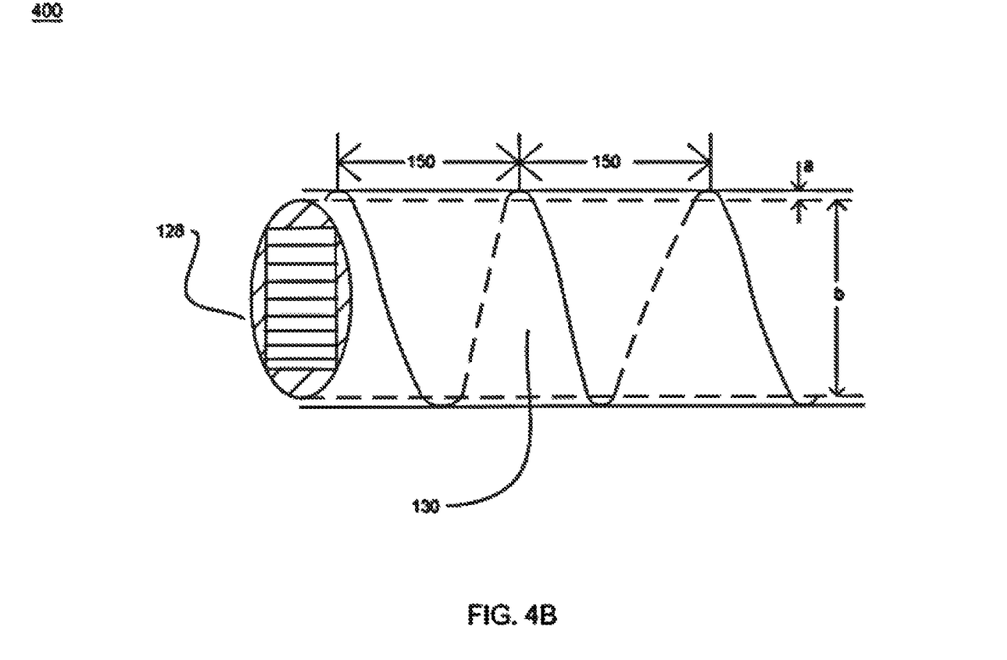
FIG. 4B is a side view of the dry padded fiber optic ribbons according to another embodiment of the present invention.
Figure 4C:
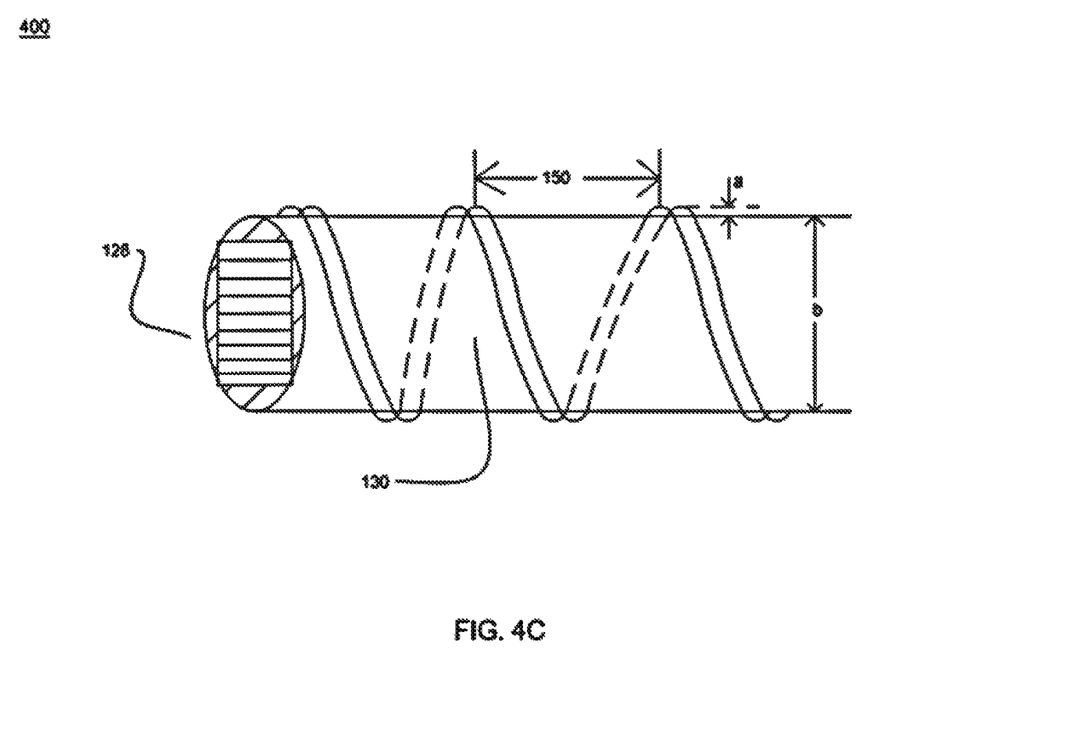
FIG. 4C is a side view of the dry padded fiber optic ribbons according to yet another embodiment of the present invention.

FIG. 4B-4C are side views of the dry padded fiber optic ribbons according to other embodiments of the present invention. Referring to FIG. 4B, the air gap is substantially 0. As such, the edges of the at least one tape 130 are substantially placed next to each other on each lay without a gap, forming a seamless appearance between the lays 150. Referring to FIG. 4C, the edges of the at least one tape 130 overlap onto each other between the cable lays 150. As such, the height of the packaged ribbon is substantially b+2a, with the bumps at the overlapping portions of the at least one tape 130 where the height is substantially b+4a.

In the embodiments described in connection with FIG. 4A-4C, there is a single tape 130 spirally wrapped around the padded stacked ribbons 128. As such the width of the cable lays 150 are determined by the width of the single tape 130. It is understood by people of ordinary skill of the art, that a plurality of the tapes can be used to wrap around the padded stacked ribbons 128. In such cases, the width of the cable lays 150 will be determined by the number of the tapes.

According to another preferred embodiment of the present invention, the at least one tape 130 wraps the padded stacked ribbon 128 in reverse oscillation lay at selected reverse oscillation areas. Usually, when one or a plurality of tapes spirally wraps around the padded stacked ribbons 128, the wrapping is spiraled in one direction, i.e. either a left-handed direction or a right-handed direction. However, in striping and splicing, especially between the access points of the optic fiber cables, areas of reverse oscillation lays are used to provide convenient handling of the cable. Reverse oscillation lay is laying the cable in such a way that the direction of the lay, either right handed or left handed, is reversed at the reverse oscillation area to the to the opposite direction.

Figure 5:
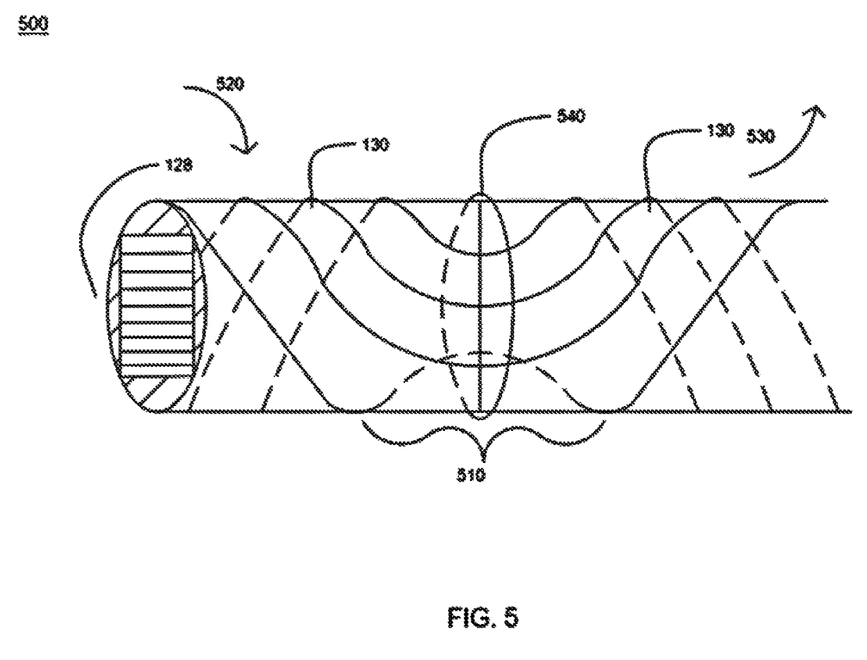
FIG. 5 is a side view of the dry padded optic fiber ribbons with reverse oscillation lay according to another preferred embodiment of the present invention.

FIG. 5 is a side view of the dry padded optic fiber ribbons 128 with reverse oscillation lay according to another preferred embodiment of the present invention. Referring to FIG. 5, a plurality of tapes 130 wrap around the padded stacked ribbon 128 at the reverse oscillation lay area 510. On the left side of the reverse oscillation lay area 510, the plurality of tapes 130 wrap around the padded stacked ribbons 128 in direction 520. Over the reverse oscillation area 510, the direction of the plurality of tapes 130 is changed to the opposite direction 530. It can be appreciated by people of the ordinary skill of the art, at the reverse oscillation areas 510, due to the change of the wrapping direction of the tapes, the length of each of the tapes in the area is longer than the length of the padded stacked ribbons 128. Therefore, when the tapes are not closely bounded to the external of the padded stacked ribbons 128, the excessive length of the tapes will tend to loosen up the tapes, separating them from each other, providing the technician with easy access.

The laying of the plurality of tapes 130 at the reverse oscillation lay area 510 may be further bounded by bindings 540. It is understood by people of ordinary skill of the art, that the bindings can be bounded in various ways not illustrated in FIG. 5. In application, the user will first locate the reverse oscillation area 510. The user will then cut open the housings and/or protective components to expose the dry padded optic fiber ribbons. The user will then cut open the bindings 540. Once the bindings 540 are cut open, the plurality of tapes 130 will loosen up as described above, providing easy access to technicians.

The above descriptions of the embodiments of the present disclosure are provided for demonstration to persons skilled in the art, instead of exhaustively listing all the embodiments or limiting the present disclosure to a single disclosed embodiment. In view of the above, various replacements and variations to the present disclosure are apparent to persons skilled in the art. Therefore, although some alternative embodiments have been discussed in detail, other embodiments are apparent or can be readily derived by a person skilled in the art. The present disclosure is intended to cover all the replacements, modifications and variations to the present disclosure that have been discussed here as well as other embodiments consistent with the spirit and scope of the present disclosure.

We claim:

1. Dry padded optic fiber ribbons for dry optic fiber cables, comprising:
    a plurality of optic fiber ribbons stacked on top of each other having a cross-sectionally rectangular shape;
    a plurality of dry paddings, each having an inner side and an outer side; and
    at least one tape wrapped continuously around the plurality of dry paddings in repeated cable lays, wherein each cable lay represents a spiral wrap of the at least one tape, and wherein the at least one tape is applied with air gaps between each repeated circle along the direction the plurality of dry paddings extend, the air gaps extending downward in a tilted direction to induce water on the outside of the plurality of dry paddings to flow downward,
    wherein each of the plurality of dry paddings is attached to one side of the rectangular shape of the stacked optic fiber ribbons, wherein each inner side of the plurality of dry paddings is in a flush contact with one side of the rectangular shape and the outer sides of the plurality of dry paddings form an elliptical shape.

2. The dry padded optic fiber ribbons as recited in claim 1, wherein each of the plurality of dry paddings is made of a super absorbent non-woven polymer, wherein each of the plurality of dry paddings has a thickness of about 0.6 millimeter at the center when there are 12 optic fiber ribbons and each ribbon encloses 12 optic fibers.

3. The dry padded optic fiber ribbons as recited in claim 1, wherein the at least one tape has a thickness of about 0.6 millimeter, wherein at least one tape has a width of about 2 to 4 millimeters.

4. The dry padded optic fiber ribbons as recited in claim 1, wherein the at least one tape wraps around the stacked optic fiber ribbons in a spiral manner to reduce air gaps formed therein.

5. The dry padded optic fiber ribbons as recited in claim 1, wherein each of the plurality of optic fiber ribbons includes a plurality of optic fibers, wherein each of the plurality of optic fibers has a diameter of about 0.2-0.25 millimeter.

6. The dry padded optic fiber ribbons as recited in claim 1, wherein the plurality of dry paddings is used to improve the symmetry of the packaged ribbons, wherein each of the plurality of dry paddings improves performance on water blockage, wherein each of the plurality of dry paddings improves optic performance that reduces the problem of Polarization Mode Dispersion ("PMD").

7. The dry padded optic fiber ribbons as recited in claim 1, wherein the dry padded optic fiber ribbons has a diameter of about 5.5-6.5 millimeter when there are 12 optic fiber ribbons and each optic fiber ribbon encloses 12 optic fibers.

8. The dry padded optic fiber ribbons as recited in claim 1, wherein each of the plurality of dry paddings comprises at least one of a polyester, polyacrylate and water swellable powder.

9. Dry padded optic fiber ribbons for dry optic fiber cables, comprising:
   a plurality of optic fiber ribbons stacked on top of each other having a cross-sectionally rectangular shape;
   a plurality of dry paddings, each having an inner side and an outer side; and
   at least one tape wrapped continuously around the plurality of dry paddings in repeated cable lays, wherein each cable lay represents a spiral wrap of the at least one tape, and wherein the at least one tape is applied with air gaps between each repeated circle along the direction the plurality of dry paddings extend, the air gaps extending downward in a tilted direction to induce water on the outside of the plurality of dry paddings to flow downward,
   wherein each of the plurality of dry paddings is attached to one side of the rectangular shape of the stacked optic fiber ribbons, wherein each inner side of the plurality of dry paddings is in a flush contact with one side of the rectangular shape and the outer sides of the plurality of dry paddings form an elliptical shape,
   wherein each of the plurality of dry paddings is made of a super absorbent non-woven polymer, wherein each of the plurality of dry paddings has a thickness of about 0.6 millimeter at the center when there are 12 optic fiber ribbons and each ribbon encloses 12 optic fibers,
   wherein the dry padded optic fiber ribbons has a diameter of about 5.5-6.5 millimeter when there are 12 optic fiber ribbons and each optic fiber ribbon include 12 optic fibers.

10. A method for dry padding optic fiber ribbons for dry optic fiber cables, comprising:
    selecting a plurality of optic fiber ribbons stacked on top of each other having a cross-sectionally rectangular shape;
    selecting a plurality of dry paddings, each having an inner side and an outer side; and
    selecting at least one tape wrapped continuously around the plurality of dry paddings in repeated cable lays, wherein each cable lay represents a spiral wrap of the at least one tape, and wherein the at least one tape is applied with air gaps between each repeated circle along the direction the plurality of dry paddings extend, the air gaps extending downward in a tilted direction to induce water on the outside of the plurality of dry paddings to flow downward,
    wherein each of the plurality of dry paddings is attached to one side of the rectangular shape of the stacked optic fiber ribbons, wherein each inner side of the plurality of dry paddings is in a flush contact with one side of the rectangular shape and the outer sides of the plurality of dry paddings form an elliptical shape.

11. The method as recited in claim 10, wherein each of the plurality of dry paddings is made of a super absorbent non-woven polymer, wherein each of the plurality of dry paddings has a thickness of about 0.6 millimeter at the center when there are 12 optic fiber ribbons and each ribbon encloses 12 optic fibers.

12. The method as recited in claim 10, wherein at least one tape has a thickness of about 0.6 millimeter, wherein at least one tape has a width of about 2 to 4 millimeters.

13. The dry padded optic fiber ribbons as recited in claim 10, wherein the at least one tape wraps around the stacked optic fiber ribbons in a spiral manner to reduce air gaps formed therein.

14. The method as recited in claim 10, wherein each of the plurality of optic fiber ribbons includes a plurality of optic fibers, wherein each of the plurality of optic fibers has a diameter of about 0.2-0.25 millimeter.

15. The method as recited in claim 10, wherein the plurality of dry paddings is used to improve the symmetry of the packaged ribbons, wherein each of the plurality of dry paddings improves performance on water blockage, wherein each of the plurality of dry paddings improves optic performance that reduces the problem of Polarization Mode Dispersion ("PMD").

16. The method as recited in claim 10, wherein the dry padded optic fiber ribbons has a diameter of about 5.5-6.5 millimeter when there are 12 optic fiber ribbons and each optic fiber ribbon encloses 12 optic fibers.

17. The method as recited in claim 10, wherein each of the plurality of dry paddings comprises at least one of a polyester, polyacrylate and water swellable powder.

* * * * *